United States Patent
Pettibone

(10) Patent No.: US 8,533,993 B2
(45) Date of Patent: Sep. 17, 2013

(54) MODULAR VERTICAL FARM CELL

(76) Inventor: Glen James Pettibone, Concord, CA (US)

( * ) Notice: Subject to any disclaimer, the term of this patent is extended or adjusted under 35 U.S.C. 154(b) by 277 days.

(21) Appl. No.: 12/947,830

(22) Filed: Nov. 17, 2010

(65) Prior Publication Data

US 2011/0120002 A1     May 26, 2011

Related U.S. Application Data

(60) Provisional application No. 61/263,344, filed on Nov. 21, 2009.

(51) Int. Cl.
*A01G 31/02*     (2006.01)

(52) U.S. Cl.
USPC ............................................................ 47/65

(58) Field of Classification Search
USPC ................. 47/65, 66.7, 73, 1.01 P, 6, 58.1 SE
See application file for complete search history.

(56) References Cited

U.S. PATENT DOCUMENTS

| | | | | |
|---|---|---|---|---|
| 6,122,861 | A * | 9/2000 | Kertz | 47/65 |
| 2009/0107037 | A1* | 4/2009 | Alinski | 47/1.1 |
| 2009/0265986 | A1* | 10/2009 | Young | 47/62 R |
| 2010/0269407 | A1* | 10/2010 | Prohaska | 47/65 |

* cited by examiner

*Primary Examiner* — Monica Williams

(57) ABSTRACT

A continuous-loop conveyor, towering upon vertical framework, which allows potted perennial plants and other plants to be transported throughout all stages of maturity in a manner which substantially multiplies yield per acre, allows production to proceed in both natural and artificial light, allows production and harvesting to be automated, and allows production to proceed in conditions which are favorable to plants but unfavorable to humans. The entire apparatus can be constructed of lightweight, cost-effective materials, which afford mass-production and mass-array into vast automatic growing operations.

7 Claims, 4 Drawing Sheets

- Modular Vertical Farm Cell

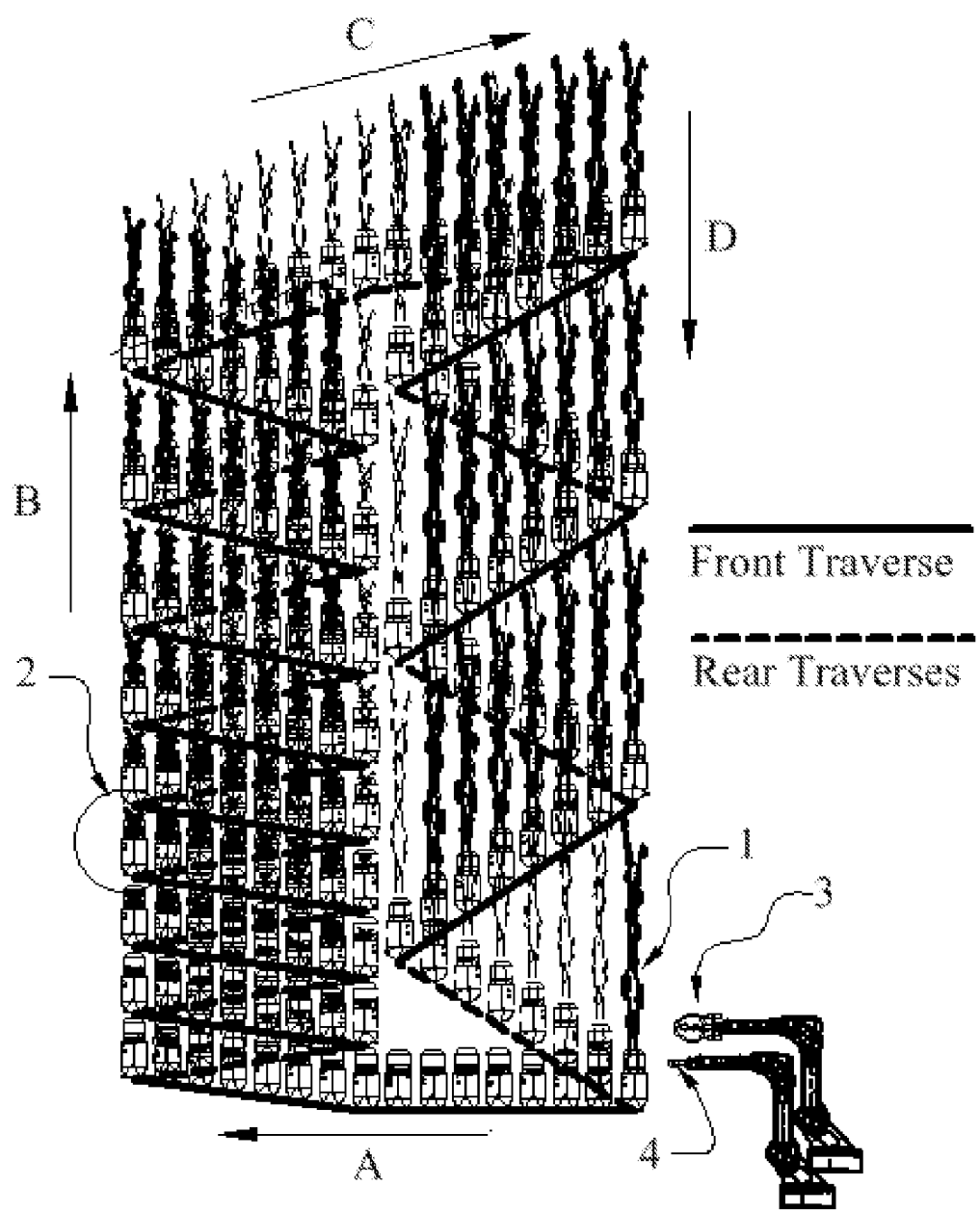
Figure - 1 - Modular Vertical Farm Cell

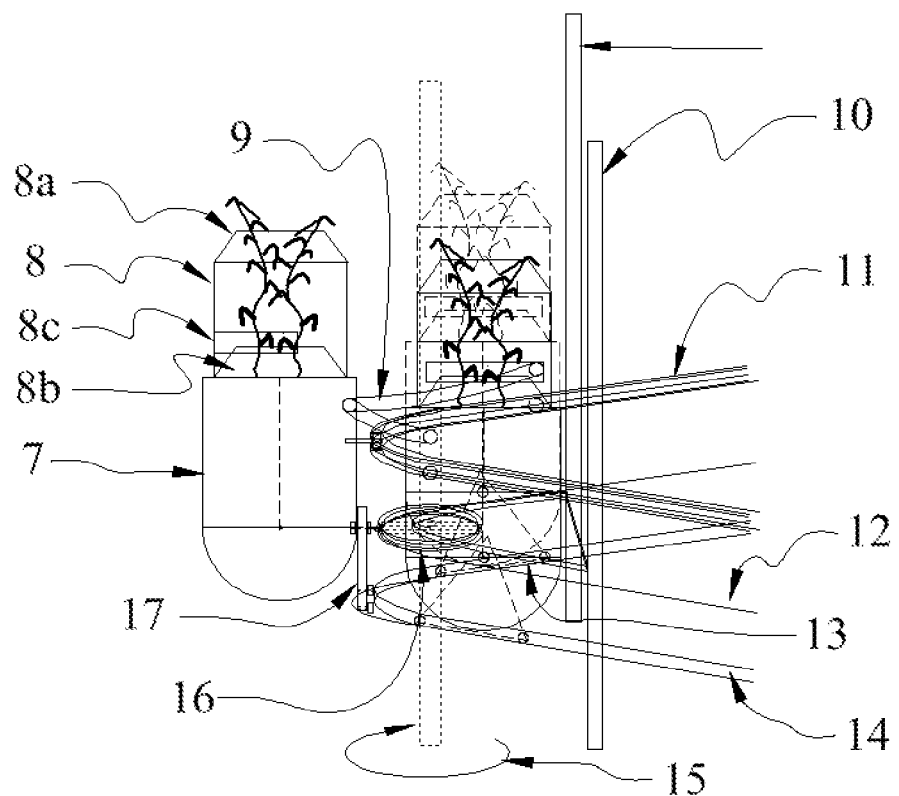
Figure - 2 - Typical End of Traverse With Drive or Idler Pulley

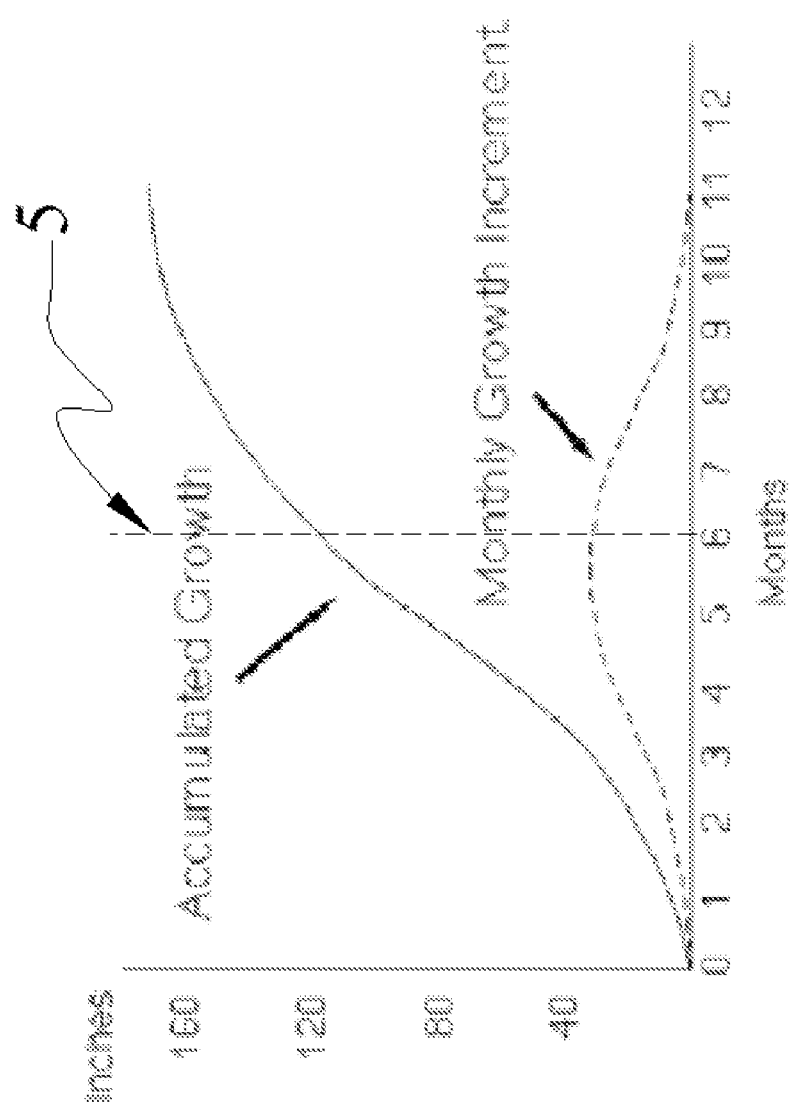
Figure – 3 – Typical Growth In Height Versus Months After Planting

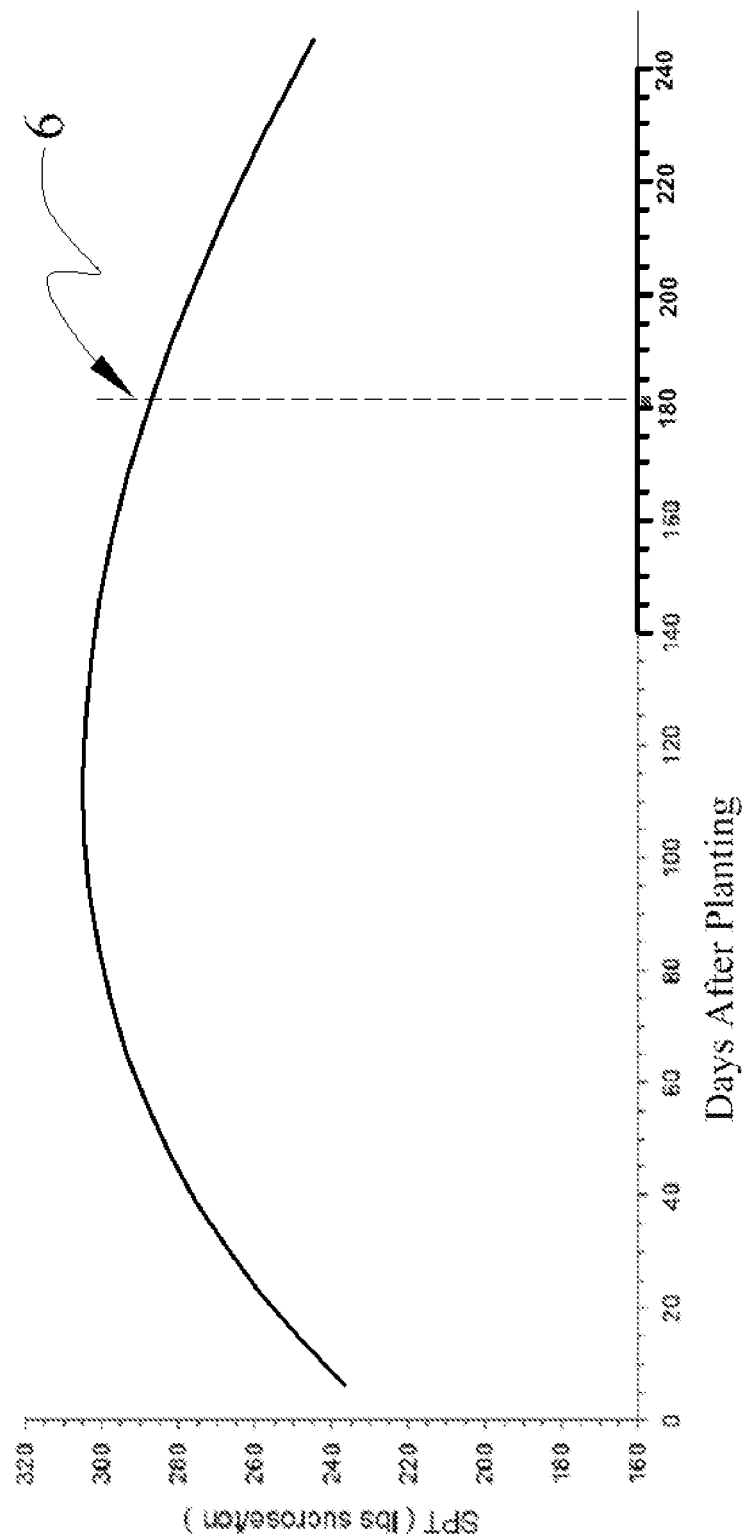
Figure - 4 - Typical Yield Per Ton Versus Days After Planting

MODULAR VERTICAL FARM CELL

1. BACKGROUND OF THE INVENTION

A. Field of the Invention

The present invention relates to methods and associated apparatus for growing agricultural crops vertically and/or in a continuous fashion throughout each year and is directed towards the conveyance of crops on towered framework, in individual planters, while protected and nurtured in a greenhouse or in individual enclosures. The invention also relates to the production of plants in a continuous conveyance loop which can be fashioned in such a way as to transport each plant in the closest possible proximity to one another and thus approximate the same planar distribution of plants normally associated with the unit ground space while gaining a multiplicative advantage in productivity as a result of multiple tiers of plants circulating from the ground up and back down vertical towers. Plants can be produced at regular intervals such as each minute, hour, day, week, or month depending on the particular species' growth versus time, the number of total plants in the tower, the height of the tower, and the rate at which the conveyance loop is indexed. The invention is well suited for the cost effective production of both food and biomass and has the advantage of a manifold reduction in required space, water, nutrients, and time for production. The present invention also accomplishes its claims with optimum economy for constructions costs. Since the invention is constructed indoors in a greenhouse setting or in individual enclosures and is supplied with its own soils, it is not dependent on location, soil conditions, water availability, weather, season, or length of day.

B. Description of Prior Art

There is a need at present for the large scale production of food and biomass both to supply emerging food and energy markets and to offset impacts to food supplies and land usage created by the increasing usage of traditional food sources as fuel and the increasing global populations placing pressures on food, water, fuel stocks, land and other resources. Prior inventions had addressed portions of the needs for automated or high-density production of crops for food and biomass, but had not addressed the optimal characteristics claimed here.

Previous inventions failed to address a vertical arrangement for growing plants and crops in a continuous fashion during the whole growing cycle, allowing seedling, immature, and mature plants to occupy portions of the growing apparatus at the same time and to arrange them in such a way as to optimize space resource utilization. U.S. Pat. No. 4,216,617 (4,216,617) failed to articulate a truly continuous loop in that an operator would periodically have to replace top and bottom portions of the described vertical apparatus and also failed thereby to produce a continuous automatable system. Also, U.S. Pat. No. 4,216,617 failed to address where the vegetation of most crops would propagate within the described arrangement; no space was afforded in the design for vegetation to achieve an appreciable height. In order to substantially increase the production of food and biomass, there is a need to fully automate farm production, as well as to produce crops on optimized vertical structures. In addition to increasing the speed of production, increasing the speed of harvest, and reducing labor and materials costs, full automation will allow the growth of plants in conditions which are optimal for plants but could be detrimental to human farmers, such as elevated carbon dioxide, lighting, temperature, nutrient chemicals, humidity, and depleted oxygen. Human farmers could not survive these conditions and so there is a need to configure automatic or robotic farming facilities which can take advantage of the highest crop density afforded by a vertical arrangement.

Previous inventions which have sought to automate the production of crops focused on certain vegetables and didn't address the growing characteristics of perennial grasses and canes such as corn, sorghum, switch-grass, and sugar cane which are key agronomic crops as well as failed to address other perennials, and other crops. U.S. Pat. No. 6,508,033 (6,508,033) generalized a three axis and multi-zone robotic arrangement for cultivation but failed to address an optimum arrangement for perennial grasses and other perennial crops in that it failed to address the geometric advantage posed by perennial crops and failed to depict the preferred arrangement for automatically harvesting and replanting these crops, as well as other similar crops. U.S. Pat. No. 6,508,033 failed to address an arrangement that would allow for adaptability to the application of soil, soilless, hydroponic, or aeroponic growing schemes. U.S. Pat. No. 6,508,033 failed to achieve the closest arrangement for plants during all phases of growth. U.S. Pat. No. 6,508,033 sequenced seedlings on a planar conveyance with a fixed ceiling height suitable for mature plants such that the over head space above the seedlings (the difference in height between mature plants and seedlings) was not utilized. U.S. Pat. No. 6,508,033 was also more adapted for the production of annuals in that each time a plant was harvested, it was completely replanted. Perennial grasses and other perennials can be clipped at the end of a full growth cycle, leaving the roots intact and will re-grow new shoots which can be harvested at the end of the next growing cycle. There is a need for a system that allows re-harvesting of perennials, and other similar crops. U.S. Pat. No. 6,508,033 arranged the plants in groups of many plants at the same stage of growth which would have the effect of increasing in-process inventory and therefore tie-up working capital. Whereas U.S. Pat. No. 6,508,033 described a multi-story vertical platform arrangement, it in effect was describing an expensive construction methodology which for many crops would prove not to be cost effective and would force an extensive use of artificial light to reach interior spaces between levels. Rather than a multi-story, frame-floor-and-ceiling approach, a towered framework approach is indicated which mimics other, proven natural forms for the photosynthetic absorption of light such as the geometry of a pine forest or a tropical rainforest canopy. A design is needed for a towered framework to elevate and convey crops in a geometry which allows enough free space and porosity for natural and artificial light to filter through and scatter from floor to ceiling and wall-to-wall. Equally, a design is needed that is based on the absolute minimization of construction materials, such as a towered conveyance upon light-gauge framework rather than material intensive traditional structural design. Safety factors and practices for human occupancy are unnecessary for the sole occupancy of plants. Both the structure and the conveyance of U.S. Pat. No. 6,508,033 were material intensive, making the design not cost effective.

2. SUMMARY OF THE INVENTION

The Modular Vertical Farm Cell (Cell) (FIG. 1) is a continuous-loop conveyor moving potted sugar cane, corn, sorghum, switch-grass, other perennial crops, and other similar crops. The Cell design allows optimal, high-density growth of perennial crops and other crops, and affords optimal positioning of mature crops for automatic harvesting by robots or other mechanisms. The Cell design also allows for optimal positioning of new seedlings or fresh-cut perennials and other crops for re-circulation back through the said conveyor and framework. Individual plants are moved in a zigzag fashion through the course of ascending and descending helical traverses (FIG. 2) for which the pitch and vertical spacing are constructed in a manner which follows the normal growth curve (FIG. 3) and provides ideal accessibility at the point of optimal harvest, as in 6 in FIG. 4 combined with 5 in FIG. 3. At this point in this example, the product of accumulated growth at 182 days (5) expressed in tons of biomass multiplied by the realized Sugar Per Ton or SPT at 182 days (6), yields the maximum achievable crop sugar at harvest. As in FIG. 1, potted seeds, seed-pieces, seedlings, or freshly clipped perennial root masses start at the beginning of traverse A. In one anticipated embodiment, a freshly planted pot can be placed at the beginning of A after the preceding pot is taken from the beginning of A. These freshly started plants travel across traverse A, where they ascend the conveyance along the reversing traverses and helical path of column B as they mature into adolescent plants. These adolescent plants cross over along traverse C to column D, and then descend the conveyance along the reversing traverses and helical path of column D as they reach finalize maturation at position 1, where they are harvested. The freshly cut perennial or other similar crop sprouts anew as it repeats this path. Alternately, a fresh pot may be exchanged at position 1, when the design is adapted for another type of crop, other than a perennial.

3. BRIEF DESCRIPTION OF THE DRAWINGS

A fuller understanding of the nature and objects of the present invention will become apparent upon consideration of the following detailed description, taken in connection with the accompanying drawings, wherein:

FIG. 1 is a side view of an entire Cell populated with example plants showing conveyance traverses in the foreground drawn in solid black lines and conveyances in the background in dashed black lines. FIG. 1 illustrates the pathway and correlated maturation of the example plants.

FIG. 2 is a side view of an exemplar conveyance traverse-end and reversal, the construction of which is typical throughout the conveyance. There are only two types of traverse-ends: driven and non-driven. FIG. 2 is intended to depict the features of each, with the drive-shaft shown in dashed lines. Details related to the pots, trolleys, guides, and drive cable are also shown in FIG. 2.

FIG. 3 shows an exemplar growth curve for an exemplar perennial crop such as sugar cane and is demonstrative in showing the process for selecting the pitches of each traverse of the conveyance depicted in FIG. 1.

FIG. 4 shows an exemplar yield curve for an exemplar perennial crop such as sugar cane and is demonstrative in showing the process for selecting the pitches of each traverse of the conveyance depicted in FIG. 1 and is demonstrative in explaining the process for selecting the optimal time-to-harvest.

4. DETAILED DESCRIPTION OF THE INVENTION

At the bottom of the conveyance at position 1, one fully mature plant at a time is harvested. Since perennial grasses and other crops can in conventional cultivation persist through many growing seasons, the harvested plant's potted seed piece continues to re-ascend the conveyor as it sprouts anew. When a plant becomes aged, a new pot with a fresh seedling is placed in the sequence as the old one is removed. The example in FIG. 1 shows the production of a sugarcane cultivar which has an optimal growing cycle of 182 to 183 days. The example shows 182 plants in progressive stages of maturity. The conveyance tower in the example is about 45 feet high, or about 4.5 times the mean height (ten feet) of one mature plant. Some plant varieties may tolerate higher or lower total column-heights. The figure shows plants traversing in the foreground in solid-lines and plants traversing in the background in dashed-lines. In this way the concept is depicted as two layers deep, and occupying about 32 square feet (four feet by sixteen feet), including two inches of clearance all the way around from adjacent cells which can be positioned together in a vast farming array. Each traverse begins with an overhead clearance of approximately six to twelve inches (or other suitable space to accommodate the natural variance in growth between individuals) between the top of the beginning plant and the bottom of the traverse over it. Each traverse ends with the same clearance above the height of more mature plant as predicted by the plant's growth curve (FIG. 3) at the end of the traverse. In this way the slope of the conveyance is adjusted and set for the growth rate of the particular crop at any given phase of maturity. For the example in FIG. 1, slopes of the conveyance traverses were selected to conform to the "hypothetical growth curve" (FIG. 3) as has been published in the literature for sugar cane by matching the predicted height of the plants at the beginning and end of each traverse. Experimental data on any particular, selected crops would be reviewed or derived through trials and exact pitches for the proposed farm cell for that particular crop would be determined based on these conditions.

The geometry of the example vertical farm cell as depicted in FIG. 1 has been initially chosen because of the availabilities of common construction materials and translucent plastic panels in four and eight foot lengths and in four by eight foot sheets respectively. In the depicted example, each pot and adjacent space occupies about one square-foot of plan-view space, and the depicted Cell occupies about thirty-two plan square feet. The example design allows for one plant to be harvested each day (or less than a day) in the same space that ordinarily would only produce thirty-two plants per year. Since there are 43,560 square feet per acre, 1361 such towers would be constructed per acre, and each potted layer would have four inches clearance between its neighboring layers to allow light to filter down the tower. Spacing within each cell as well as spacing between cells can be selected in order to optimize light permeation through the canopy formed by arrays of cells.

For the example in FIG. 1, the 183-day optimal sugar cane harvest schedule was estimated by combining the considerations of typical plant size (FIG. 3, item 5) and typical plant yield (FIG. 4, item 6) in "Sugar per Ton" (SPT). For sugar cane and other crops, this data is published in the scientific literature, or it can be empirically determined. FIG. 4 shows SPT versus harvest schedule for some sugarcane varieties.

For some crops, it is desirable to control the growth of the plants to avoid the plants interfering with conveyance, competing for light, and to allow precise location of the plants. These goals can be accomplished through a pot-cap of specific geometry. For example, for sugarcane, every individual plant is cultivated in an individual pot (7). The pot is capped with a translucent guide (8) that consists of an outer shell with an upper tapered shell (8a) on top and a lower tapered shell (8b) inside which serve to guide each maturing plant towards the center. The upper tapered shell (8a) creates a predictable diameter and a known position for the mature plant's stalk at some distance from the base at which a gripper (3) mounted on a robot or other device can be programmed to grip the stalk. A slit (8c) in the outer shell allows a cutter (4) mounted on a robot or other device to be inserted into the guide and the lower flute (8*b*) allows the plant to be clear-cut around a predictable path once it is fully mature while the stalk is held by the gripper (3). Once cut, the robot or other device can either transport the harvested plant or can place the harvested plant on a conveyor for transportation to a processing area such as a milling operation. By fixing the position for gripping and cutting, the design greatly simplifies the requirements for automation.

Each potted plant in the Cell is irrigated through a daisy-chained system which includes individual, flexible irrigation conduits (9) strung from pot to pot. Each conduit is connected near the top of one pot in order to capture over flow and is inserted to the soil bottom of the adjacent pot through a dip-tube. This allows a single irrigation source at the top of the Cell, at the junction of traverse C and column D (CD) to irrigate every pot in the cell to the height at which the conduits are connected. Upon filling the pot at CD to the level of the conduit connection, water over-flows to the next lower adjacent pot such that water cascades accordingly across traverse C and down column B as well as down column D and across traverse A. At the bottom, residual water can be collected in a sump or sumps and then recycled to CD. Alternately, in a similar fashion, each potted plant in the Cell will be irrigated through a daisy-chained system which includes individual, flexible irrigation conduits (9) strung from pot to pot equipped with pressure compensating emitters at each pot. Residual water will be collected in a sump or sumps and reused through pasteurization and re-amending with liquid fertilizers so as to recycle all effluent as much as feasible.

The traverses are fastened or welded to vertical supports (10) consisting of long, straight columns fabricated of light-gauge steel or other materials and having cross sections such as angle, channel, I, T, or flat as is indicated and appropriate to provide the main, structural, vertical support for the cell. The upper track (11) and the lower track (14) guide the pot and trolley (7 and 17) and also provide structural support by bracing the vertical supports (10) in order to prevent buckling and allow the supports to be made from lighter, cheaper materials.

A pulley (16) mounted on a bracket (13) is fastened to the vertical supports (10) located at the ends of each traverse. Through this pulley (16) is threaded a cable or chain (12) to which every trolley is fastened. For a traverse configured as driven, by turning the pulley (16) one-quarter turn, the cell is indexed by one plant. The conveyor can be driven by a motor connected to a shaft (15) of a pulley (16) at one or more traverse-ends.

Every pot is mounted on a trolley (17) which is equipped with two or more bearings, rollers, or wheels at the base that ride upon the lower track (14). The trolleys (17) are connected to the base of the pots by a pivot-pin upon which the pots can pivot with respect to the trolleys. Each pot is kept level or at another optimal angle (such as tilted to maximize insolation) by a follower bearing, roller, or wheel which rides in the upper track (11). While rolling in the upper track (11), the follower is restrained by the track from moving in the either vertical direction. Depending on the pitch of the lower track (14) and drive cable or chain (12), the pot can therefore be maintained level or at another angle by fixing the position of the upper track (11) at different distances from the lower track (14) as indicated. The trolley can be made like a basket which allows the removal and replacement of the pot.

Depending on the crop chosen, adequate overhead clearance would be needed in between traverses below and above to allow for statistical variance in plant growth. This clearance would be needed to avoid damage to the plant tops and to avoid jamming the conveyor. The design is such that sensors or other means can be employed to detect fast-growing outliers and speed up the conveyor sequencing to afford the fast-growing individuals room to grow. Each individual plant in the Cell will have a unique identification code. When fast-growing individuals reach the harvest point, they will be identified by this code, and seeds or seed pieces will be retained for evaluation and for possible re-introduction as preferred individuals (fastest-growing, highest-yielding) in new plantings. Since sugarcane and other crops planted by seed pieces produces clones, in these cases, eventually, the whole Cell will be bred towards the highest performance cultivar and will achieve the greatest height uniformity and greatest productivity. Likewise, conveyor speeds and output will be increased and optimized.

Optimal pot size can be selected by review of the scientific literature related to root-growth and irrigation, or can be determined through empirical trials. The Cell can then be optimized for a given crop with respect to the pot size, pot spacing, structural construction, drive-horsepower and mechanical advantage, traverse pitch, irrigation, and other factors. Optimal soils will be selected based on the literature or through empirical trials.

In order to minimize the cost for each tower, the conveyance can be equipped with braking or ratcheting, but a choice can be made to omit a motor and substitute a crank or other mechanism reliant upon an external motive force. This can save the cost of motors and electrical wiring and further facilitate the mass-construction of vast arrays of Cells incorporated into automated growing operations or farms. For sugarcane, it is estimated that a typical total weight supported by and conveyed upon the steel framework of each cell will be about 12,000 pounds, including pots, soil or soilless media, water, and stalks. This weight is readily supported by light-gauge formed steel members. Lightweight construction saves both fabrication costs for each Cell and also reduces loads upon structural foundations to which the Cells are anchored.

Since certain changes may be made in the foregoing disclosure without departing from the scope of the invention herein involved, it is intended that all matter contained in the above description and depicted in the accompanying drawings be construed in an illustrative and not limiting sense.

What is claimed is:

1. A Modular Vertical Farm Cell comprising a continuous-loop conveyor moving and cultivating potted sugar cane, corn, sorghum, switch-grass, other perennial crops, or other crops on a towering framework comprising of:
   a. A framework;
   b. Perennial crops or other crops in pots arrayed along reversing traverses and circulating through stages of maturation upon the framework,
   c. Mature crops in pots positioned at an accessible point on the framework for automatic harvesting by robots or other mechanisms,
   d. New seedlings or fresh-cut perennials in pots positioned for circulation back through the said conveyor and framework,
   e. A conveyor configuration for conveying said pots along said reversing traverses in which individual plants are moved in a zigzag fashion through the reversing traverses comprising a course of ascending and descending helical traverses upon the framework for which the pitch of and vertical spacing between traverses are constructed in a manner which follows the a normal growth curve and affords ideal accessibility at the a point of optimal harvest, f. In said conveyor configuration pots including seeds, seed-pieces, seedlings, or freshly clipped perennial root masses start on the framework at the beginning of a lower, horizontal traverse, at a point of ideal accessibility, freshly initiated plants travel across the lower, horizontal traverse, where they ascend the conveyor along the reversing traverses and helical path of a vertical column on the framework as they mature into adolescent plants, the adolescent plants cross over along an upper, horizontal traverse on the framework to a second vertical column on the framework, where they descend the conveyor along the reversing traverses and helical path of said second vertical column until they reach final maturation at the starting position, where they are harvested, the freshly cut plants are then replaced if aged or recycled through the same path again as described if said plants continue to be vital after harvest.

2. A Modular Vertical Farm Cell comprising a continuous-loop conveyor as claimed in claim 1 wherein said framework transports pots including plants and incorporates a guide or guides which gather and fix the positions of both pots and plant material for optimal holding and cutting areas for said plants, said holding and cutting areas are thereby facilitated for automated holding, harvesting, and picking.

3. A Modular Vertical Farm Cell comprising a continuous-loop conveyor as claimed in claim 2 comprised to facilitate optimal plant breeding by fixing the positions of said plants at all stages of maturity, thereby allowing said plants to be automatically measured and compared, further said fixing of positions allows automated determinations to take place as to which plants exhibit the best genetic characteristics and the subsequent automatic and preferential selection of said optimal individuals for subsequent breeding and planting.

4. A Modular Vertical Farm Cell comprising a continuous-loop conveyor as claimed in claim 1 comprised to allow automatic operation such that the entire apparatus can be placed in conditions such as a controlled environment enclosure or greenhouse; the conditions of which might be ideal for said plants but which humans cannot withstand such as but not limited to elevated carbon-dioxide, depleted oxygen, enhanced lighting in excess of natural sunlight, elevated temperatures, elevated humidity, dispersions of deliberately chosen pollutants, and the additions of favorable chemicals for fertilization, anti-microbial, and herbicidal purposes.

5. A Modular Vertical Farm Cell comprising a continuous-loop conveyor as claimed in claim 1 comprised to allow automatic operation in order to achieve the fastest possible conveyance from harvest to plant use and thereby retain the freshest characteristics.

6. A Modular Vertical Farm Cell comprising a continuous-loop conveyor as claimed in claim 1 where said plants are arranged with optimum density by spacing of conveyor traverses such that the size of plants at each stage of maturity is most precisely afforded.

7. A Modular Vertical Farm Cell comprising a continuous-loop conveyor as claimed in claim 6 where said plants, while optimally spaced to minimize overall space are yet spaced such that natural and artificial light sources can filter throughout the conveyance and such that statistical variations in plant size are afforded by extra space allowance.

\* \* \* \* \*